INVENTOR
MICHAEL HACSKAYLO
BY Hurvitz & Rose
ATTORNEYS

REFLECTION SPECTRA OF $Fe_3O_4$

INVENTOR
MICHAEL HACSKAYLO
BY Hurvitz & Rose
ATTORNEYS

United States Patent Office 3,441,429
Patented Apr. 29, 1969

3,441,429

THIN FILM FERRITES

Michael Hacskaylo, Falls Church, Va., assignor to Melpar, Inc., Falls Church, Va., a corporation of Delaware Filed Mar. 31, 1966, Ser. No. 539,079
Int. Cl. B44d *1/44;* C23c *13/04*
U.S. Cl. 117—62 5 Claims

ABSTRACT OF THE DISCLOSURE

A thin ferrite film having a thickness ranging from 2,000 angstroms (A.) to 20 microns is deposited under vacuum from a mixed oxide composition of $(100-X)\%$ $Fe_3O_4$ and X% $B_2O_3$, where X ranges upward to 10 percent, onto a substrate maintained at a temperature within the range from approximately 27° C. to approximately 750° C. under vacuum pressure less than $10^{-4}$ mm. abs. Hg.

The present invention relates generally to thin-film technology; and more particularly to thin magnetic films and to processes for producing such films.

Over the past several years, the increasing demand for miniaturization and micro-miniaturization of electronic apparatus and related components has resulted in a burgeoning research and development effort in the art of thin films. In particular the applicability of thin film ferrites to a variety of uses in the electrical and electromagnetic arts, such as in high speed switching circuits for computers, has led to the development and proposal of a large number of methods for producing such films. Among the various methods utilized in the deposition of thin films in general, the most widely used include vacuum evaporation and sputtering, electroplating, electroless plating and anodization, vapor plating and pyrolysis.

In the case of thin ferromagnetic films of ferrites, known methods include:

(1) Depositing of the proper metal or metal mixtures (e.g., for bimetallic or trimetallic compositions) in thin film form by vacuum evaporation (i.e., vacuum deposition) techniques, followed by oxidation of the film for the appropriate ferrite; and (2) Pyrolytic deposition (by decomposition of vapor) to the proper ferrite.

The first method is described extensively in the literature, reference being made, for example, to the following articles:

Banks et al., "Formation and Study of Thin Ferrite Films," Symposium of American Vacuum Society (Pergamon Press, New York, 1960), pp. 297–305;

Silber, "Variation of the Magnetization of Thin Nickel Ferrite Films with Thickness," Studies in Microwave Physics, Final Report No. PIBMRI–1241–64 (1964), pp. 13–39;

Baltz, "Preparation of Ferrite Films by Evaporation," Appl. Phys. Letters, 7, 10, 1965; and to U.S. Patent No. 3,148,079, entitled "Process for Producing Thin Film Ferrimagnetic Oxides," granted Sept. 8, 1964, to Banks et al.

The principal disadvantages of the known methods of making thin film ferrites are that extremely high substrate temperatures are required, in the range from 800° to 1200° C., and that more than one process is necessary.

It is a primary object of the present invention to provide new and improved methods of producing thin ferromagnetic films of ferrites.

More specifically, it is an object of the present invention to provide methods of depositing thin ferrite films in a vacuum at substrate temperatures ranging from room temperature to 700° C., without the requirement of any post-oxidation treatment.

Briefly, in accordance with the present invention the ferrite material is deposited by vacuum evaporation from a mixed oxide starting composition of $(100-X)\%$ $Fe_3O_4$–X% $B_2O_3$, where X may range from 0 to 10, on a suitable substrate maintained at a temperature within the range from room temperature to 700° C. The vacuum evaporation system may be entirely conventional, with deposition from a non-reactive crucible or boat at pressures of the order of $10^{-5}$ torr (mm. abs. Hg). No post-oxidation process is required; hence, the thin-film ferrites may be fabricated by standard vacuum-deposition techniques completely in vacuo.

The principal advantages of thin-film ferrite production methods of the present invention are that the ferromagnetic material can be deposited in vacuum, the deposition method is compatible with the general concept of thin-film technology, and the mixtures for the various ferrites can be controlled by appropriate starting materials.

The above and still further objects, features, and attendant advantages of the invention will become apparent from a consideration of the following description of the process in accordance therewith and of the characteristics and properties of thin film ferrites so prepared, and from the drawing, in which.

EXAMPLE

Figure 1:
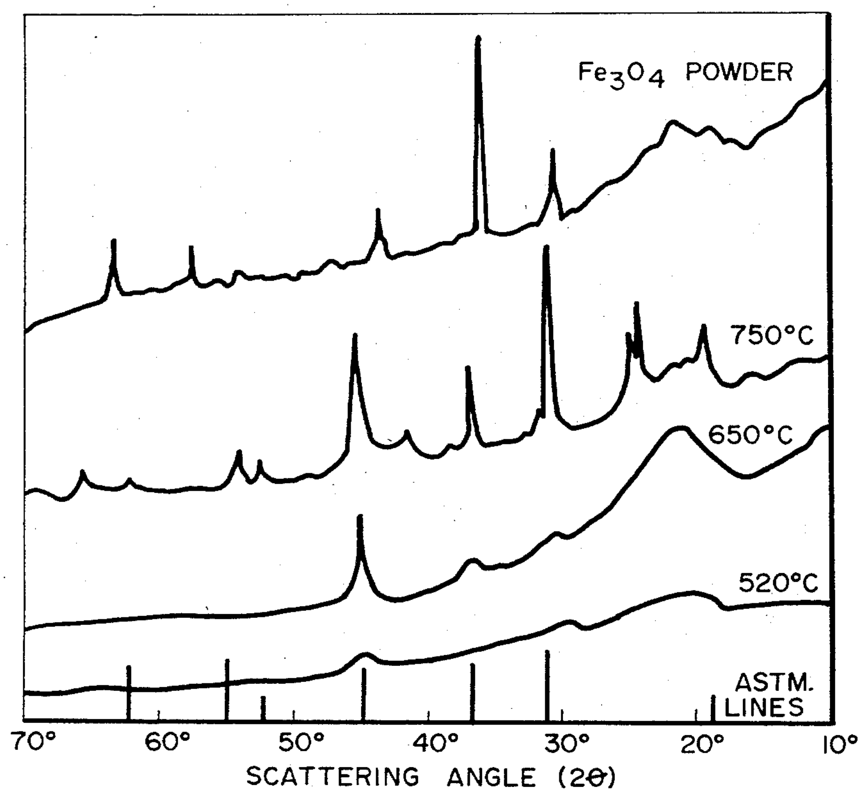
FIGURE 1 is a comparison of the X-ray diffraction patterns of certain of the films, the $Fe_3O_4$ powder, and the ASTM reference lines.

In practicing the method of the invention, mixed oxide starting compositions were formed by thoroughly mixing a small percentage (in the range from 0 to 10% by weight) of a stable, low melting-temperature oxide, $B_2O_3$, with a large percentage (in the range from 100 to 90% by weight) of $Fe_3O_4$ (magnetite), both in powder form. The starting material mixtures, in varying percentages as indicated in the aforementioned ranges, were each deposited from a tungsten boat at pressures less than $10^{-4}$ torr (from approximately 1 to $2\times10^{-5}$ torr) on fused-silica substrates held at temperatures within the range from room temperature (about 27° C.) to about 700° C. Each mixture was initially heated to about 650° C. for 5 minutes and then brought up to a temperature of about 1360° C. for deposition. The deposition rate was approximately 300 A./sec., and films ranging in thickness from 2000 angstroms to 20 microns were obtained. Outgassed substrates of fused silica, Corning 0211 and 5079 glasses, were used. The vacuum-deposition techniques employed in depositing each film were completely standard, and conventional operational procedures were used.

Some of the films were deposited at substrate temperatures of 200° C. to 400° C. and were then annealed in the vacuum at various substrate temperatures up to 750° C. for 15 minute periods. The films were permitted to cool to 60° C. prior to removal from the vacuum.

It was found that film resulting from a $Fe_3O_4$-$B_2O_3$ mixture of 95%–5% by weight was optimum; a larger percentage of $B_2O_3$ (and a correspondingly smaller percentage of $Fe_3O_4$) resulted in films that were hydroscopic and light in color, whereas a lesser ratio of $B_2O_3$ resulted in films that were reduced to the metal, or nearly so. While most of the films produced and investigated were of the 95%–5% mixture, films resulting from mixtures over the entire range of percentages by weight indicated above were prepared and studied also.

Film properties (a) Film structure.—All film structures were examined by X-ray diffraction techniques and electron microscopy. In order to obtain initial results relating to iron-oxide films, a reduced film deposited from a 99% $Fe_3O_4$–1% $B_2O_3$ mixture was heated in air at 1200° C. for two hours and then rapidly quenched in ice water. The X-ray diffraction pattern of the reduced film showed the Fe line at $d$=2.00 A. The oxidized and quenched film exhibited a predominantly red color with some degree of black appearance; the X-ray diffraction pattern did not indicate the presence of elemental iron, but it was found that $\alpha$—$Fe_2O_3$ (rhombohedral structure) and $\gamma$—$Fe_2O_3$ (tetragonal structure) were present. The existence of several lines not agreeing with the known lines was also noted, but as will subsequently be more fully discussed, it appeared that source impurities were responsible.

No X-ray diffraction lines were exhibited by the films that were deposited on substrates from room temperature to 400° C., indicating that the film was either amorphous or consisted of extremely small crystallities. Films deposited on substrates maintained at temperatures in the same range (i.e., 200° to 400° C.), and then annealed in situ in the evaporation system under a vacuum of $1\times10^{-5}$ torr in a temperature range of about 520° C. to about 750° C. did exhibit diffraction lines indicating various degrees of magnetite crystalline structure. The X-ray diffraction patterns of the $Fe_3O_4$ powder, and of the films annealed for 15 minutes in the specified vacuum at 520° C., 650° C., and 750° C., are shown in FIGURE 1 and compared to the ASTM reference index (Smith, Ed., Index to the Powder Diffraction File, ASTM Special Technical Pub. 48–M2. Index No. 11–614 (ASTM, Baltimore, Md., 1963)). The reference lines are shown at the lower portion of FIGURE 1. The film annealed at 520° C. showed a slight crystal structure, and the film annealed at 650° C. exhibited increasing magnetite structure, as indicated by agreement with the magnetite lines. The film annealed at 750° C. exhibited lines indicating the presence of crystalline $B_2O_3$, in addition to magnetite lines. The positions of the lines of the X-ray diffraction patterns show better agreement with the ASTM lines than with the lines from the $Fe_3O_4$ powder. Slight variations in determining the $d$ lines are attributable partly to instrumentation error, but to a greater extent are produced by line broadening and slight displacement of the lines as a result of impurities in the $Fe_3O_4$ powder. In any event, the lines corresponding to magnetite $Fe_3O_4$ are present and are indicative of the practicality and realization of vacuum deposition of thin-film ferrites from the mixed source materials ($Fe_3O_4$+$B_2O_3$).

The films that were deposited at temperatures to 500° C. had glossy smooth surfaces. Minute crystals were discernible at 600° C. with increasing growth size to 700° C.

Some of the films were stripped from the substrates and the structure studied by electron microscopy. Films deposited and annealed at substrate temperatures less than 500° C. were found to be almost structureless; i.e., apparently amorphous. Films annealed at higher temperatures could not be stripped for examination.

Electron microscopy studies of films deposited on SiO coated copper grids at room temperature showed the films to be amorphous and continuous. These films were approximately 50 A. thick. Changes were observed as a function of temperature as the films were heated in situ in the microscope. It was found that the films were amorphous and continuous at temperatures to 420° C., but at 550° C. a high density of crystals formed rapidly. The electron diffraction patterns agreed quite closely with the X-ray diffraction patterns of ferrite films annealed at 750° C. for 15 minutes in the vacuum system.

(b) Chemical analysis.—The source material of $Fe_3O_4$ (obtained from Fisher Scientific Co.; purified, not certified) was analyzed by emission spectroscopy for cation impurity. The analyses of the $Fe_3O_4$ powder are compared with the chemical analyses of the deposited film in the following table.

TABLE.—CHEMICAL ANALYSES OF $Fe_3O_4$ POWDER AND FILM

| Element | $Fe_3O_4$ powder | $Fe_3O_4$ film |
|---|---|---|
| Al | FT | W |
| B | W | W |
| Ca | FT | W |
| Cr | W | W |
| Co | FT | S |
| Fe | VS | VS |
| Mg | W | W |
| Ni | FT | S |
| Sn | X | FT |
| W | X | X |

NOTE.—Concentration: FT, 0.001–0.005%; T, 0.005–0.01%; W, 0.01 0.5%; M, 0.5–4.0%; S, major component; VS, major component; X searched, but not detected.

A 95% $Fe_3O_4$–5% $B_2O_3$ film was chemically analyzed for free or elemental Fe content (the reduced state of $Fe_3O_4$) for purposes of determining whether the magnetic properties of the films were attributable thereto. The film on the fused silica substrate was immersed in a solution of ferric chloride for three days for reduction of the ferric chloride to ferrous chloride. By calibrating a standard solution by means of titrating the ferrous chloride, the amount of free iron was determined. The measured value of the ferrite films was less than 100 p.p.m. the minimum detectable limit of the calibrated solution. The results tabulated in the table show that Co and Ni are major components with Fe, and tend to indicate that the film may be a mixture of magnetite and bimetallic and trimetallic ferrites.

Since tungsten was the material of the crucible from which the mixed oxide source material was deposited, its presence was specifically sought in the chemical analysis. As shown in the table the results were negative, indicating that the mixture of $Fe_3O_4$ and $B_2O_3$ was unaffected by tungsten.

Figure 2:
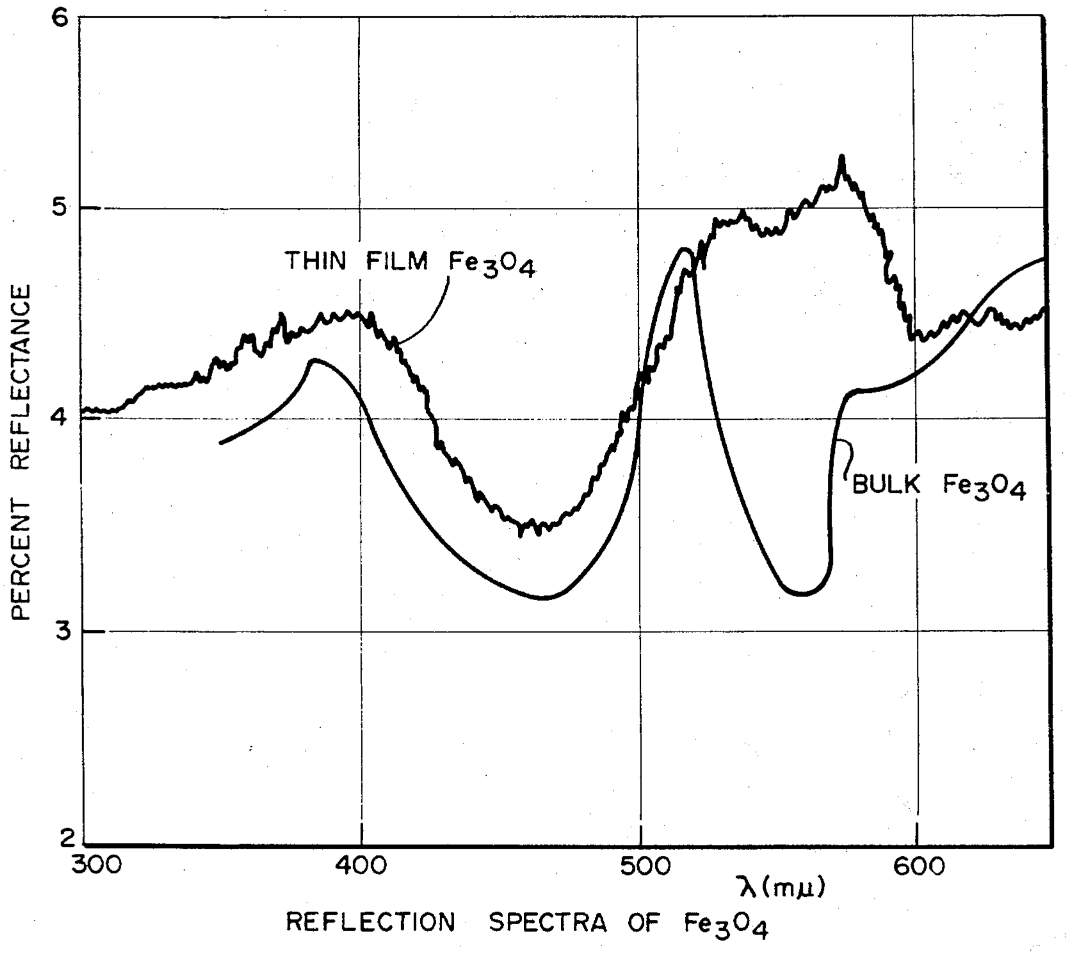
FIGURE 2 is a comparison of optical reflectance spectra of a thin film ferrite produced by a process according to the invention and a bulk ferrite of the intended composition.

(c) Optical reflectance spectra.—The vacuum-deposited ferrite film structure was studied by means of optical reflectance spectra from 300 m$\mu$ to 650 m$\mu$ on a Cary 15 spectro-photometer. The reflectance curve of a 95–5 film deposited at 400° C. and a comparison with the reflectance curve of bulk $Fe_3O_4$ (disclosed by Vratny and Kokalas, "The Reflectance Spectra of Metallic Oxides in the 300–1000 Millimicron Region," Applied Spectroscopy, 16, (1962) 176) are shown in FIGURE 2. The reflection spectra from films deposited and/or annealed at the other substrate temperatures showed the similar bands but they were not as predominant nor as well resolved as the film deposited at 400° C. At the lower temperatures the lack of resolution is probably attributable to the amorphousness of the films. For the spectra at the higher temperatures, the resolution may have decreased as a result of the scattering of light by the granular surface. Good agreement is shown for the band at 390 m$\mu$ and 580 m$\mu$, while the band at 510 m$\mu$ of the bulk sample shows a lack of exact agreement with the film, where the band appears at 530 m$\mu$. However, the general agreement of the bulk and film optical reflection spectra indicates the film structure is similar to that of the bulk material. Analysis of the film was also made on a Beckman IR 5A spectrophotometer for the infrared region (2–15$\mu$) and the reflectance spectra showed structure and a strong absorption peak at 2.7$\mu$, with other less pronounced peaks at 3.7$\mu$, 4.15$\mu$, and 4.85$\mu$.

(d) Resistivity.—In the investigation of the electrical properties of the vacuum-deposited films, the resistance of films deposited in a configuration of 2 cm. on each edge, i.e., an area of 4 cm.$^2$, on fused silica substrates was examined for films ranging in thickness from 2000 A. to 20$\mu$ and obtained from statring compositions of from 0 to 10% $B_2O_3$ and 100 to 90% $Fe_3O_4$, respectively. The relationship of resistance to film composition and structure indicated that a 1–5% $B_2O_3$ and 99–95% $Fe_3O_4$ mixture annealed in vacuum at 650° C. was optimum. Films of the 95–5 mixture and approximately 4.5$\mu$ thickness exhibited high resistance ($10^8$ Ω/sq.) when deposited on a substrate at room temperature, the resistance decreasing with increasing annealing temperatures. At the annealing temperatures of 650° C. to 750° C., the film resistivity was approximately 0.02 ohm-cm., which approaches the value for bulk magnetite (see Smit et al., Ferrites. (Wiley, New York, 1959), chapter IV).

(e) Magnetic properties.—The change of magnetization of the films in a changing magnetic field is detectable as an induced voltage proportional to the time rate of change of inducted flux, B. The magnetic switching *db/dt* peaks (unintegrated signals) and the B–H loops (integrated signals) were detected in a modified Helmholtz drive coil with a "figure 8" sense coil. The magnetic field strength of the drive coil was measured at 800 c.p.s. with a Hall-effect gaussmeter, and was found to be linear with drive coil current to the maximum field of 60 oe.

Figure 3:
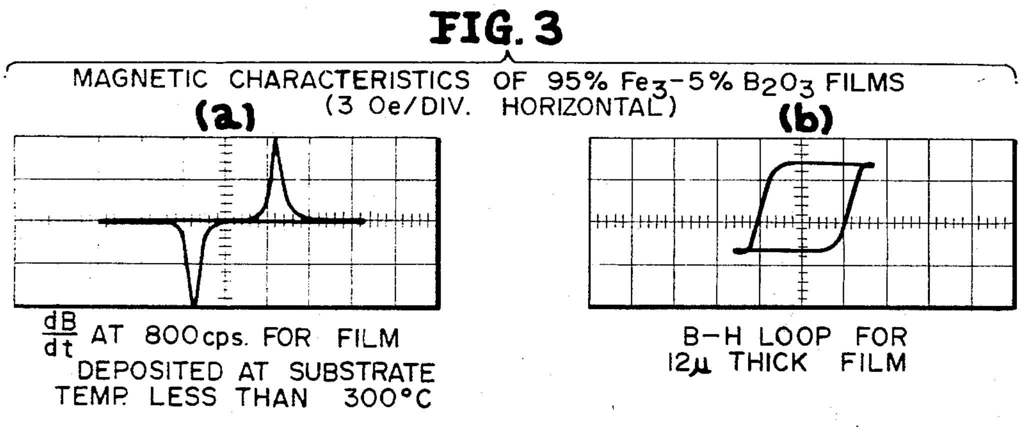
FIGURES 3(*a*) and (*b*) are respectively diagrams of the magnetic switching peaks ($dB/dt$) and the integrated signal (B–H loop) for a deposited film.

Investigation of the magnetic properties of the films revealed existence of low coercivity for films deposited at substrate temperatures less than 300° C. The induced voltage peaks, *db/dt*, at 800 c.p.s. are shown in FIGURE 3(*a*). Switching field strength was 2.7 oe. Films deposited at higher substrate temperatures exhibited coercivities several orders of magnitude higher than those deposited at the lower temperatures (i.e., the amorphous films). The coercivity values were found to be independent of substrate temperature to 300° C., and of film thickness. At 300° C., the *db/dt* peaks were greatly reduced. No other switching peaks were observed to 60 oe, which was the limit of the drive coil. The integrated signal (B–H loop) for a film 12$\mu$ thick is shown in FIGURE 3(*b*).

The saturization magnetization ($4\pi M_s$) of the films was determined by comparing the magnetization values with known values of other ferromagnetic films. A foil of nickel 12.5$\mu$ thick was used, along with vacuum deposited nickel films in a thickness range matching the thicknesses of the films deposited from the 95% $Fe_3O_4$–5% $B_2O_3$ mixture. The saturization magnetization of the nickel foil and films were in substantial agreement with each other. By comparison with the B–H loops of ferromagnetic nickel in the bulk and film form, the saturation magnetization of the low coercivity films was determined to be approximately 6000 gauss.

All of the vacuum-deposited ferrite films, varying in starting compositions from 100% to 90% of $Fe_3O_4$ and from 0 to 10% of $B_2O_3$ by weight, in thickness from 2000 A. to 20$\mu$, and in substrate temperatures during deposition from room temperature to 700° C., exhibited DC magnetic response.

Having described the process of my invention, the characteristics and properties of films obtained thereby, I claim:

1. Process for the production of thin ferromagnetic films of ferrites with film thicknesses ranging from 2000 angstroms to 20 microns, comprising vacuum deposition of film of the desired thickness from a mixed oxide composition of (100—X)% $Fe_3O_4$ and X% $B_2O_3$, where X ranges up to 10, onto a substrate maintained at a temperature within the range from approximately 27° C. to approximately 750° C., under vacuum pressure less than $10^{-4}$ mm. aba. Hg.

2. The process according to claim 1 wherein the film is deposited on substrate maintained at temperature less than 400° C. and thereafter annealed in situ under said pressure at a substrate temperature within the range from approximately 550° C. to approximately 750° C. for a period of less than one hour.

3. The process according to claim 1 wherein said substrate is fused silica.

4. The process accordng to claim 1 wherein said mixed oxide composition is evaporated from a tungsten crucible.

5. Process of producing thin film ferrites from a mixed oxide composition of $Fe_3O_4$ and $B_2O_3$, comprising vacuum evaporation of film of desired thickness from said composition onto a substrate maintained at a temperature less than approximately 750° C. at a pressure less than $10^{-4}$ torr.

References Cited

UNITED STATES PATENTS

| | | | |
|---|---|---|---|
| 2,920,002 | 1/1960 | Auwarter | 117—106 X |
| 3,086,882 | 4/1963 | Smith | 117—54 |
| 3,124,490 | 3/1964 | Schmeckenbecher | 117—236 |
| 3,148,079 | 9/1964 | Banks et al. | 117—62 |

WILLIAM D. MARTIN, *Primary Examiner.*

B. D. PIANALTO, *Assistant Examiner.*

U.S. Cl. X.R.

117—106, 121, 123; 252—62.51, 62.58